US 6,736,416 B1

(12) United States Patent
Romeo

(10) Patent No.: US 6,736,416 B1
(45) Date of Patent: May 18, 2004

(54) PORTABLE REFRESHMENT SYSTEM

(76) Inventor: Rodney Romeo, 4238 Hickory Rd. Apt. C, Mishawaka, IN (US) 46545

( * ) Notice: Subject to any disclaimer, the term of this patent is extended or adjusted under 35 U.S.C. 154(b) by 0 days.

(21) Appl. No.: 10/190,774

(22) Filed: Jul. 8, 2002

Related U.S. Application Data

(60) Provisional application No. 60/303,650, filed on Jul. 6, 2001.

(51) Int. Cl.⁷ ................................................ B62B 1/00
(52) U.S. Cl. .................................. 280/47.26; 280/47.18
(58) Field of Search ................................. 280/30, 47.26, 280/47.18, 47.19, 47.35, 47.27, 47.16, 47.2, 659, 654, 43.14, 43.15, 47.11, 47.17, 47.28, 47.31, 79.11, 79.2, 79.3, 79.5, 79.7, 43.24

(56) References Cited

U.S. PATENT DOCUMENTS

| | | | | |
|---|---|---|---|---|
| 2,905,480 A | * | 9/1959 | Giovannelli | 280/659 |
| 3,460,850 A | * | 8/1969 | Franklin | 280/47.2 |
| 3,866,936 A | * | 2/1975 | Hedges | 280/47.26 |
| 4,284,286 A | * | 8/1981 | Lewallen | 280/30 |
| 4,316,615 A | * | 2/1982 | Willette | 280/47.26 |
| 4,832,362 A | * | 5/1989 | Chen | 280/645 |
| 5,074,571 A | * | 12/1991 | Reese | 280/47.19 |
| 5,823,550 A | * | 10/1998 | Bennett et al. | 280/47.26 |
| 5,876,047 A | * | 3/1999 | Dennis | 280/47.35 |
| 6,050,660 A | * | 4/2000 | Gurley | 280/47.26 |
| 6,170,839 B1 | * | 1/2001 | Kizewski | 280/47.26 |
| 6,394,471 B1 | * | 5/2002 | Watson | 280/47.19 |
| 6,398,235 B1 | * | 6/2002 | Cary | 280/47.26 |
| 6,454,293 B1 | * | 9/2002 | Anderson | 280/651 |
| 6,533,298 B2 | * | 3/2003 | Sims | 280/47.26 |

* cited by examiner

*Primary Examiner*—Brian L. Johnson
*Assistant Examiner*—Hau Phan
(74) *Attorney, Agent, or Firm*—Botkin & Hall, LLP

(57) ABSTRACT

A portable refreshment system with multiple compartments each having a lid, at least one of the compartments being insulated for providing storage of food goods and another of the compartments for providing storage for items other than food. The portable refreshment system includes a support at one end and a landing gear. The system may be shifted about the rotatable support between a substantially prone position and an elevated use position by the landing gear.

13 Claims, 5 Drawing Sheets

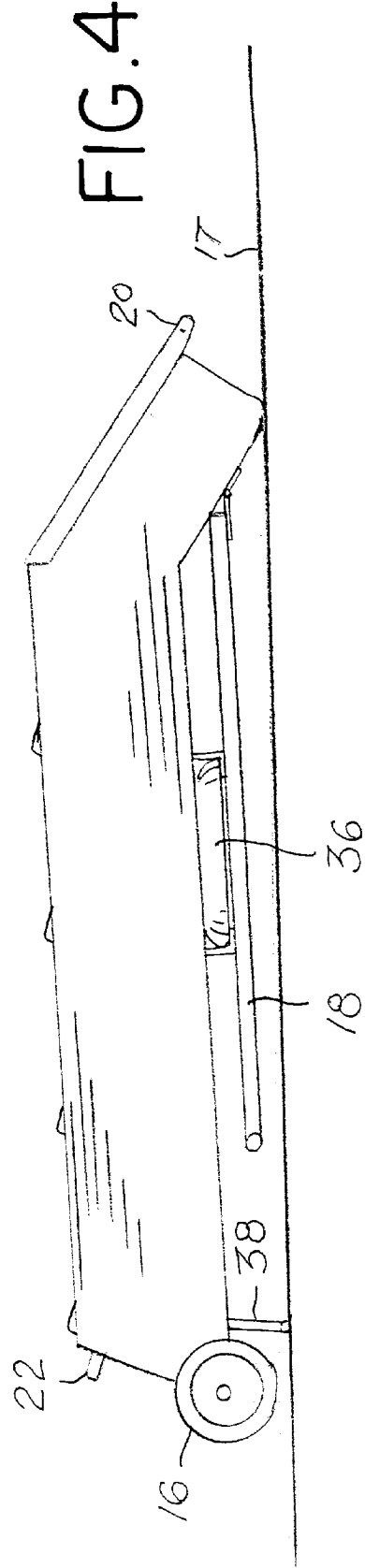

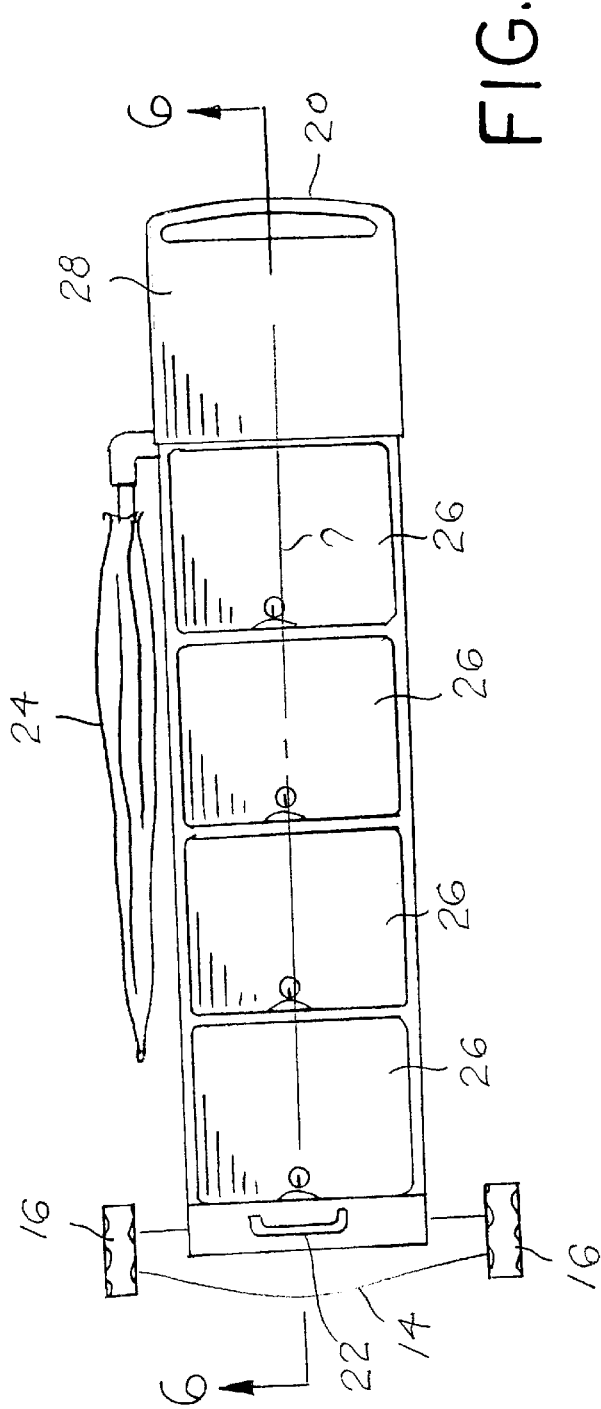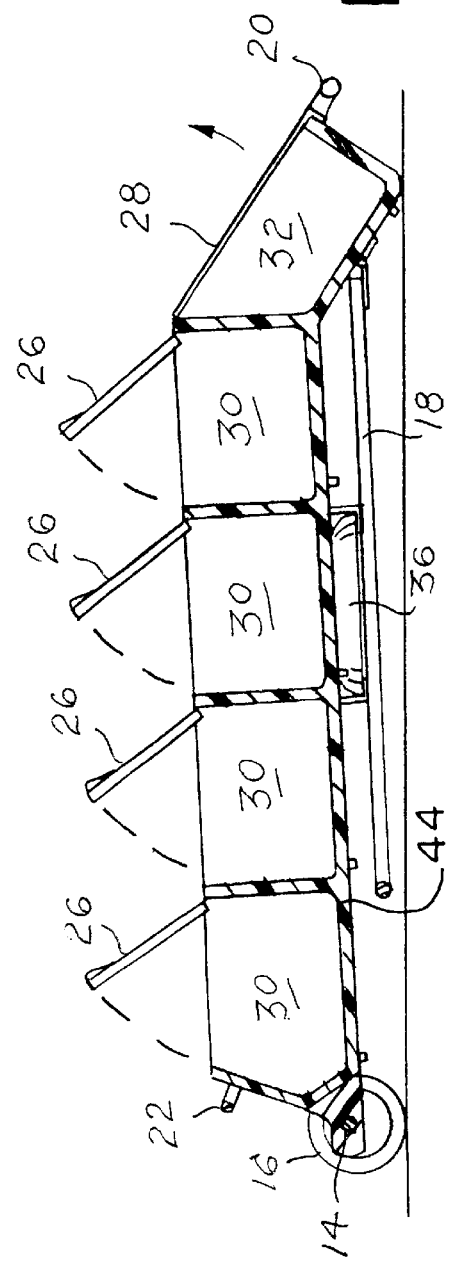

PORTABLE REFRESHMENT SYSTEM

CROSS-REFERENCE TO RELATED APPLICATION:

This application claims the benefit of provisional U.S. patent application Ser. No. 60/303,650, filed Jul. 6, 2001.

SPECIFICATION

1. Field of the Invention

The present invention relates to a portable refreshment system and, more particularly, to a portable refreshment system with multiple compartments, a detachable grill, an undercarriage including an axle and wheels, a landing gear, an integrated handle and an umbrella.

2. Discussion of Prior Art

Devices to store food which are insulated to maintain temperatures either cooler or warmer than ambient temperature are well known in the art. Examples of such devices include Styrofoam insulated single compartment boxes in which food and ice are commingled in an effort to chill beverages for consumption. Foods which are desirable to be stored in a state warmer than ambient condition may be placed in such Styrofoam insulated single compartment boxes after being preheated.

Hand operated devices with wheels which allow portability of goods are also well known in the art. Examples of such devices include luggage with two or more wheels mounted on the ground contacting portion of the luggage with a handle to grasp and pull the luggage piece. Portable single compartment food coolers with handles and primitive wheel systems are also known in the art which allow portability over smooth hard surfaces. However, the prior art fails to fill a long felt need of ease of portability, storage of the entire group implements used for food preparation and food products desirably transported in a single trip to and from locations such as a beach which does not allow access via smooth hard surfaces.

Accordingly, it is desirable to have a portable refreshment system which allows the contemporaneous storage of foods some of which are warmer while still others are cooler than ambient temperature. Additionally, it is desirable to have a portable refreshment system which allows ease of portability over ground conditions which are not merely a smooth, hard surface. Additionally, it is desirable to have a portable refreshment system which allows the storage and transport of all the implements needed in the preparation of food for consumption at locations such as a picnic or beach. Additionally, it is desirable to have a portable refreshment system which allows access to the various items at a convenient height and specifically where said items are not located at ground level.

It is therefore an object of the invention to provide a portable refreshment system with multiple compartments, a detachable grill, an undercarriage specifically designed to allow transport over uneven terrain, a landing gear, an integrated handle and an umbrella. It is a further object of the invention to provide access to the storage compartments at various heights. It is a further object of the invention to provide a food preparation work surface that may be fixed at a convenient height.

SUMMARY OF THE INVENTION

The invention disclosed herein includes a portable refreshment system with multiple compartments each having a lid, at least one of the compartments being insulated, a support at one end of the system, and a landing gear. The system may be shifted about the rotatable support between a substantially prone position and an elevated use position supported by the landing gear.

Each of the multiple compartments may be insulated so that each such compartment may independently store food at a desirable temperature. Thus, the invention allows the contemporaneous independent storage of food items which are to be desirably kept at temperatures which are both warmer and cooler than ambient temperature. Each of the compartments may have a separate lid which may be independently opened and closed and which allows access to one food storage compartment without disturbing adjacent compartments. It is a further feature of the invention that one or more of such compartments may also be used to store non-food items. Food preparation items as well as barbeque briquettes may thus be conveniently stored and transported in the same assembly as the food items.

An undercarriage including axle and wheels which is located at one end of the system provides for the ease of portability. The design and location of the undercarriage allow convenient transport over smooth hard surfaces. The overall design and relative position of the integrated handle in reference to the undercarriage also allows traversing uneven terrain. For instance stair steps are easily traversed because the underside of the portable refreshment system contacts stair step edges at an angle which allows the plane of said underside to easily glide up and over the stair step edge. The center of balance relative to the integrated handle and undercarriage also provides added stability while traversing rough terrain conditions.

Yet another feature of the present invention is the ability to place the portable refreshment system in the prone position. Placing the portable refreshment system in the prone position facilitates the loading of the individual compartments. Another benefit of being able to place the portable refreshment system in the prone position is the ability to substitute or change tires.

An additional, feature of the portable refreshment system is an integrated jack. The jack elevates the wheels above the ground when the system is placed in the prone position. Once elevated, the wheels may be fitted with oversize tires which improve ease of portability over loose soft surfaces such as sand at the beach.

As briefly described above, placement of the integrated handle above and in front of the center of gravity of the loaded portable refreshment system provides added stability when transporting the system over uneven terrain. A further benefit of the integrated handle is that it also provides ease of manufacture resulting in cost savings. Still another benefit of the integrated handle is that it also provides double duty to facilitate assess to a top compartment.

Another feature of the present invention is the top compartment which provides convenient storage of either ice, liquids or a combination of both. A dispenser is incorporated into the top compartment which allows easy access to the contents of the top compartment. In the alternative, the above-described handle may be used to raise the top compartment lid which gives direct access to the stored contents of the top compartment.

Another feature of the invention is a landing gear located at the distant end from the undercarriage end. The landing gear allows the top compartment to be elevated above the ground. By elevating the top compartment, the lid to the top compartment provides a convenient work surface for the operator to prepare or serve foods because the lid is positioned relatively both flat and parallel to the ground. Elevation of the top compartment end of the portable refreshment system also minimizes contact with the ground. Minimizing contact with the ground satisfies a cultural need to prevent food storage compartments from being stored directly upon the ground. Yet another benefit of elevating the food storage compartments above the ground is the resulting sanitation and health benefits.

Another feature of the invention is a rack and removable grill. The rack allows the grill to be removably stored in a convenient location under the portable refreshment system. By storing the grill in this location ash and other debris is prevented from contaminating the contents of the various compartments. The rack also provides protection of the grill when the portable refreshment system is placed in the prone position.

Another feature of the invention is the integration of an umbrella. The portable refreshment system not only provides a convenient place to store the umbrella, but also allows for the deployment of the umbrella. The integration of the umbrella provides protection from the elements for both the system and the operator. This incorporation of this protection increases the time foods stored cooler than ambient temperature may be kept within an acceptable temperature range. Likewise, the umbrella protects the food preparation area from direct exposure to the elements.

BRIEF DESCRIPTION OF THE DRAWINGS

FIG. 4 is a side view of the portable refreshment system shown in its prone position with the jack extended to elevate the wheels.

FIG. 5 is a top view of the portable refreshment system shown in prone position with the compartment lids in the closed position and the umbrella stored.

FIG. 6 is a longitudinal sectioned view of the portable refreshment system taken along line 6—6 of FIG. 5 with the compartment lids in the open position.

DETAILED DESCRIPTION OF THE PREFERRED EMBODIMENTS

Figure 1:
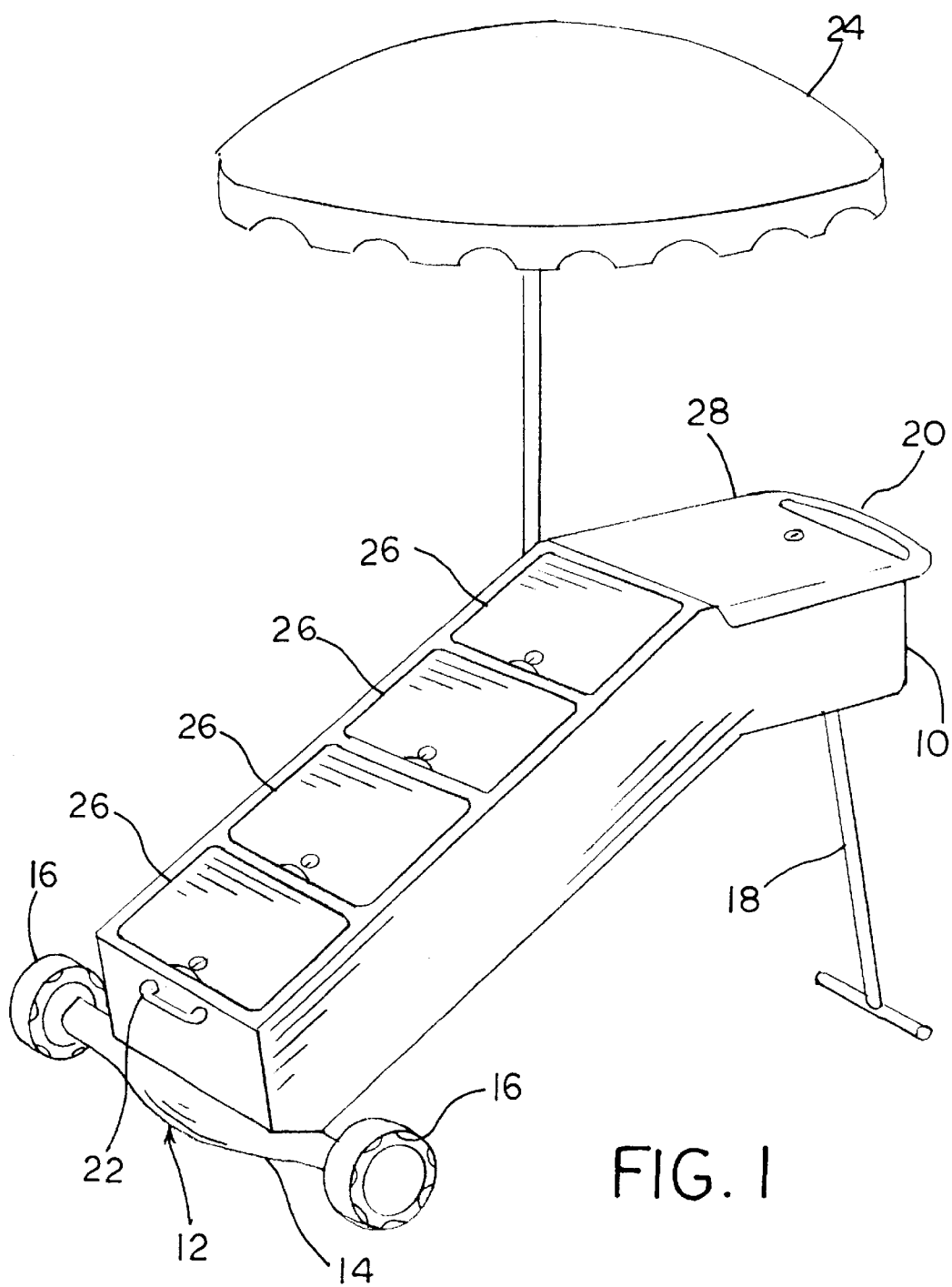
FIG. 1 is a perspective view of the portable refreshment system shown with the lids to the five compartments in closed positions, the landing gear extended supporting the system in its elevated position and the umbrella deployed.
Figure 2:
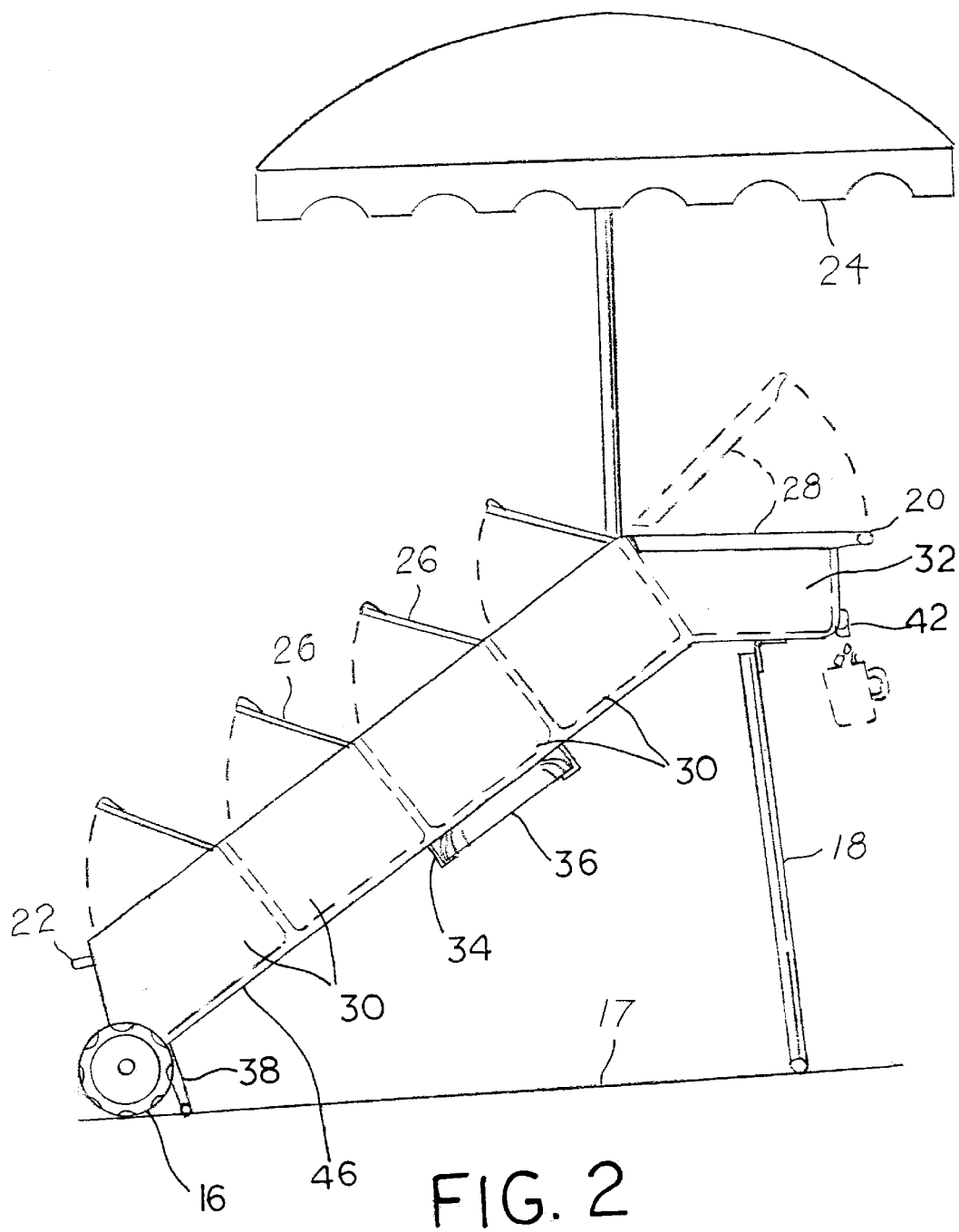
FIG. 2 is a side view of the portable refreshment system shown with the lids to the five compartments in partially open position, the landing gear extended, thus supporting the top compartment end at a fixed elevated position above the ground, and the jack extended for illustrative purposes.

FIGS. 1 and 2 illustrate the preferred embodiment of a portable refreshment system assembly 10. Assembly 10 includes an undercarriage 12 which includes an axle 14 and wheels 16, a landing gear 18, an integrated handle 20, auxiliary handle 22, umbrella 24, side compartment lids 26 and top lid 28. As shown in FIG. 2 four side compartments 30 are accessible when the compartment lids are independently opened. Likewise, when top lid 28 is opened a top compartment 32 is accessible which is particularly convenient to store ice and liquids (not shown). A rack 34 receives a removable grill 36 for easy storage. Jack 38 allows for the easy elevation of wheels to allow oversized wheels 40 to be installed to allow transport over soft surfaces such as sand. Dispenser 42 is located at the end of the top compartment.

Figure 3:
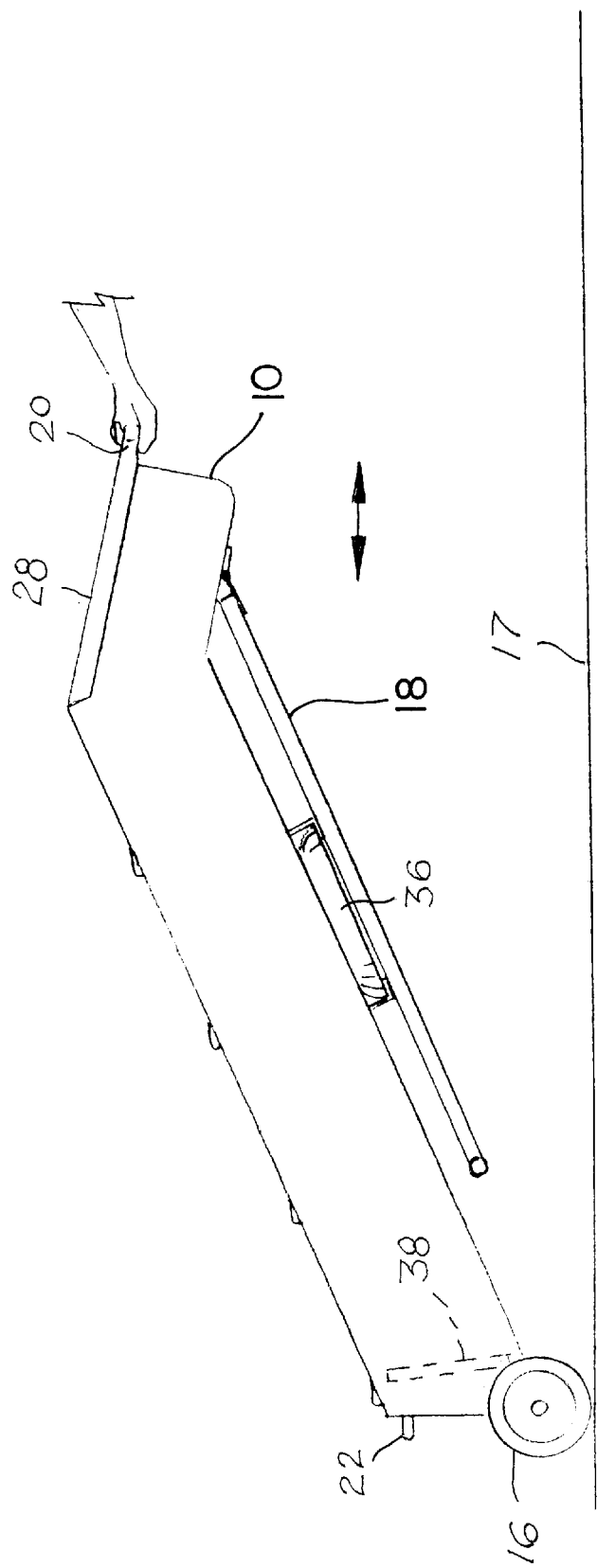
FIG. 3 is a side view of the portable refreshment system shown in the transport mode with the landing gear retracted.

Now referring to FIG. 3, assembly 10 is shown in the transport mode with the landing gear 18 and jack 38 retracted. FIG. 4 shows assembly 4 in the prone position for ease of loading of the side compartments with the jack 38 extended. FIG. 5 shows assembly 10 from the top view with the assembly in a prone position. FIG. 6 is a cutaway along the longitudinal axis 7 of FIG. 5 and best shows the insulated walls 44 which segment each of the side compartments 30 and the top compartment 32.

Having described the component parts of the system, the operation of the system consists of laying the assembly in the prone position to allow ease of loading each of the individual side compartments 30 with food stores (not shown) organizing the stores based upon the desired temperature to be maintained. In the preferred embodiment ice or liquids in combination with ice is placed in the top compartment 32. Non-food items such as cooking utensils or barbeque briquets may also be stored in any one of the compartments. After loading is completed the lids to each of the compartments are closed as shown in FIG. 4.

A single person can easily raise the assembly from the prone position into an elevated position and with one hand tow the assembly with the wheels 16 rolling on even ground by grasping handle 20. While towing the assembly the underside of the assembly 46 is inclined at an angle which facilitates dragging the assembly up stair steps or over uneven ground on which the wheels will not freely roll across.

A jack 38 allows the wheels 16 to be elevated above the ground 17 when the assembly 10 is placed in the prone position. The jack is rotated from a retracted position as seen in FIG. 3 into an extended position as seen in FIG. 2 where it can be used as a fulcrum which causes the undercarriage to be elevated as the assembly is lowered into the prone position. The elevated undercarriage as seen in FIG. 4 allows installation of oversized wheels upon the assembly. The oversized wheels provide floatation over soft ground surfaces such as sand.

Upon arriving at the destination the landing gear 18 is extended so that the assembly is supported with the top compartment fixed at a convenient height above ground level for the operator to use in food preparation. The elevation of the top compartment prevents the need for a separate device to elevate food storage containers off the immediate ground. An added benefit of elevating the compartments is the prevention of contamination of the food stores because the assembly does not rest directly on the ground. Yet another benefit of elevating the compartments is the ability to fixably maintain food and food preparation at heights more readily accessible to the disabled.

Once the assembly 10 is placed in its upright elevated position the grill 36 is accessible to be removed from the grill rack 34 located on the bottom surface of the assembly and the grilled is used by generally known techniques. One or more side compartments 30 provides ease of access of cooking utensils for the operator. Likewise, dry goods such as barbeque briquets previously stored may be accessed for use with the grill from one of the side compartments.

The integrated umbrella 24 may be easily deployed to provide shelter from the elements for both the operator and the assembly 10. Shading provided by the umbrella improves storage time for the food being stored at a temperature below ambient temperature. Likewise, protection from either sun or rain provided by the umbrella improves operator comfort during food preparation. The umbrella's protection of the food preparation area also provides for added sanitary and health benefits.

The top compartment lid 28 provides a working surface which the operator may use for food preparation. After the food is prepared the top compartment lid also provides additional service by providing guests with an area to prepare the foods on their plates for consumption. The top compartment 32 provides convenient storage of ice as well as liquids. The ice and liquids may be dispensed directly in drink containers via the integrated dispenser 42. In the alternative, when the top compartment lid is not being used for food preparation it may be raised to allow direct access to the ice and liquids stored in the top compartment.

Furthermore, those skilled in the art will appreciate that the conception, upon which this disclosure is based, may readily be used as a basis for the designing of additional structures, methods and systems other than described above for carrying out the several purposes of the present invention. Further, the abstract is neither intended to define not limit the invention of the application, which is measured by the claims.

What is claimed is:

1. A portable refreshment system transportable over a supporting surface, said system comprising compartments wherein one of said compartments is insulated for providing storage of food goods and another of said compartments for providing storage for items other than food, each said compartment including a separate lid which may be independently opened and closed, a support at one end of said system for engaging said supporting surface, a landing gear shiftable between an extended and a retracted position, said landing gear for engaging said supporting surface in said extended position, said system pivotally shiftable about said support between a substantially prone position and an angularly elevated use position, said system supported in said elevated use position by said landing gear, wherein one of said compartments being located next to the opposite end, said one compartment being substantially horizontal and the reminder of said compartments being inclined when said system is in said elevated position.

2. The portable refreshment system of claim 1 further including an undercarriage, said undercarriage including an axle, said support including a pair of wheels journalled about said axle.

3. The portable refreshment system of claim 2 further including an integrated handle which is located at the opposite end of the portable refreshment system from the undercarriage by which the system may be pivoted about said wheels between an elevated position and a prone position.

4. The portable refreshment system of claim 3 further including an extendable jack located between said axle and handle, said jack having a retracted position and an extended position, said jack for engaging said supporting surface when in said extended position to act as a fulcrum as the system is lowered from elevated position into said prone position raising said wheels from the supporting surfaces.

5. The portable refreshment system of claim 3 wherein said landing gear is pivotally shiftable between said extended and retracted positions.

6. The portable refreshment system of claim 2 wherein said compartments extend in end to end alignment along the longitudinal axis of the system, one of said compartments being adjacent said handle and angularly offset from the remainder of said compartments.

7. The portable refreshment system of claim 6 wherein said angularly offset compartment has a pivoted lid, said lid when closed being generally horizontal when the portable refreshment system is in said elevated position.

8. The portable refreshment system of claim 1 further including a rack which allows the storage of a removable grill.

9. The portable refreshment system of claim 1 further including an umbrella having a use position and a storage position.

10. A portable refreshment system comprising multiple longitudinally aligned compartments wherein one of said compartments is insulated for the storage of food goods, another of said compartments providing storage for items other than food, each of said compartments including a separate lid which may be independently opened and closed, wheels located at one end of the system, said wheels for engaging a supporting surface, a handle located at the opposite end of the system from the wheels, a jack having a retracted position and an extended position and being located between said axle and handle, said jack for engaging said supporting surface when in said extended position to act as a fulcrum for raising said wheels from said supporting surface as said system is lowered by said handle from an elevated position into a prone position relative to the supporting surface, a landing gear located adjacent said opposite end of said system for contact with said supporting surface to retain the system in said said elevated position.

11. A portable refreshment cart transportable over a supporting surface, said cart comprising compartments, one of said compartments being insulated for the storage of food goods, another of said compartments for the storage of items other than food, each said compartment including a separate lid which may be independently opened and closed, an undercarriage located at one end of said system, said undercarriage having an axle and connected wheels, an integrated handle located at the opposite end of said system from the undercarriage by which the cart may be pivoted about said wheels between an elevated position and a prone position, an extendable jack located between said axle and handle, said jack having a retracted position and an extended position, said jack for engaging said supporting surface when in said extended position to act as a fulcrum as the cart is lowered from its said elevated position into said said prone position raising said wheels from said supporting surface.

12. A portable refreshment systems transportable over a supportive surface, said system comprising a plurality of compartments aligned longitudinally and extending between first and second ends of the system, a pair of wheels at said first end, a handle at said second end, said support system being shiftable about said wheels by the raising and lowering of said handle between a prone position and an inclined elevated position, one of said compartments being located next to said handle, said one compartment being substantially horizontal and the remainder of said compartments being inclined when said system is in said elevated position, said remainder of said compartments being substantially horizontal when said system is in said prone position, a landing gear located approximate said second end of the system and being shiftable between an extended and a retracted position, said landing gear engaging said supporting surface when in said said extended position and supporting said system in said elevated position.

13. The portable refreshment system of claim 12 wherein said one compartment includes a lid which may be independently opened and closed, said lid providing a working surface when closed and said system is in said elevated position.

* * * * *